United States Patent [19]
Kamoshita et al.

[11] Patent Number: 6,104,579
[45] Date of Patent: *Aug. 15, 2000

[54] MAGNETIC DISK HEAD HAVING DATA ZONE AND CONTROL SIGNAL ZONES WHICH GENERATE DIFFERENT LIFTS WHEN FLOWN OVER BY A HEAD SLIDER

[75] Inventors: Yuko Kamoshita; Osamu Morita, both of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/831,641

[22] Filed: Apr. 9, 1997

[30] Foreign Application Priority Data

Apr. 11, 1996 [JP] Japan .................................. 8-115730
May 20, 1996 [JP] Japan .................................. 8-150025

[51] Int. Cl.⁷ ..................................................... G11B 5/82
[52] U.S. Cl. ............................................................ 360/135
[58] Field of Search ................ 360/51, 55, 77.01–77.08, 360/103, 135

[56] References Cited

U.S. PATENT DOCUMENTS

| | | | |
|---|---|---|---|
| 4,912,585 | 3/1990 | Belser et al. ............................ | 360/135 |
| 4,935,835 | 6/1990 | Godwin et al. ........................... | 360/135 |
| 5,138,511 | 8/1992 | Hoshimi et al. ......................... | 360/135 |
| 5,296,995 | 3/1994 | Yonezawa et al. ...................... | 360/135 |
| 5,325,244 | 6/1994 | Takano et al. ......................... | 360/77.03 |
| 5,402,278 | 3/1995 | Morita ................................... | 360/77.05 |
| 5,504,639 | 4/1996 | Kawazoe ................................ | 360/103 |
| 5,504,646 | 4/1996 | Tanaka et al. ........................... | 360/135 |
| 5,537,282 | 7/1996 | Treves et al. ........................... | 360/135 |
| 5,585,989 | 12/1996 | Kuromiya et al. ...................... | 360/135 |
| 5,590,009 | 12/1996 | Ishida ................................... | 360/135 |
| 5,680,267 | 10/1997 | Tanaka et al. ............................ | 360/51 |

FOREIGN PATENT DOCUMENTS

| | | | |
|---|---|---|---|
| 53-138314 | 12/1978 | Japan ................................. | 360/77.07 |
| 8-017155 | 1/1996 | Japan . | |
| 8-195047 | 7/1996 | Japan . | |

*Primary Examiner*—Jefferson Evans
*Attorney, Agent, or Firm*—Hill & Simpson

[57] ABSTRACT

A magnetic disk having data record and control signal record zones configured so that the flying height of a head slider thereof varies thereby enabling recovery of control signals. The flying height of the head sliders over the control signal record zone is less than the flying height of the head slider over the data record zone yet greater than a glider height.

8 Claims, 11 Drawing Sheets

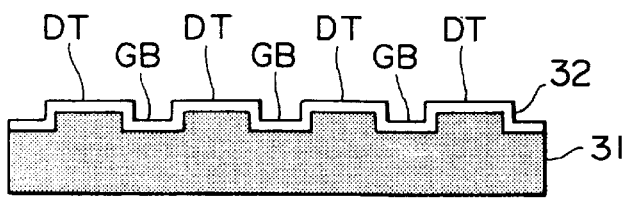
FIG. 7A
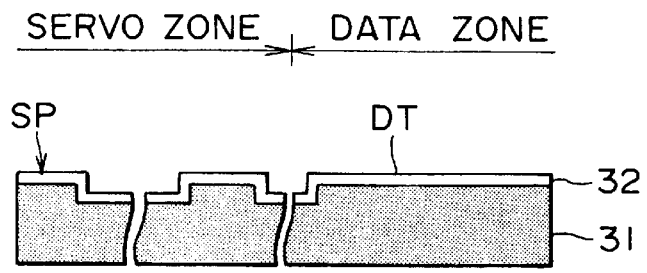
FIG. 7B
FIG. 8
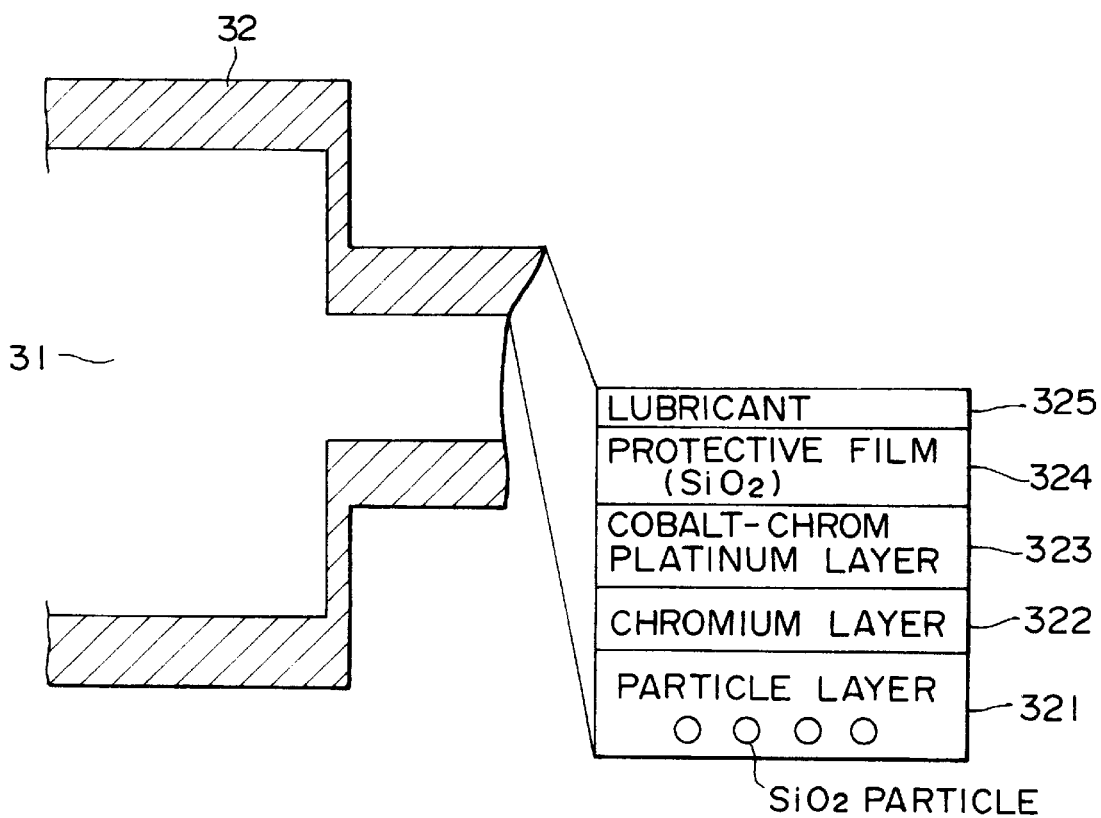

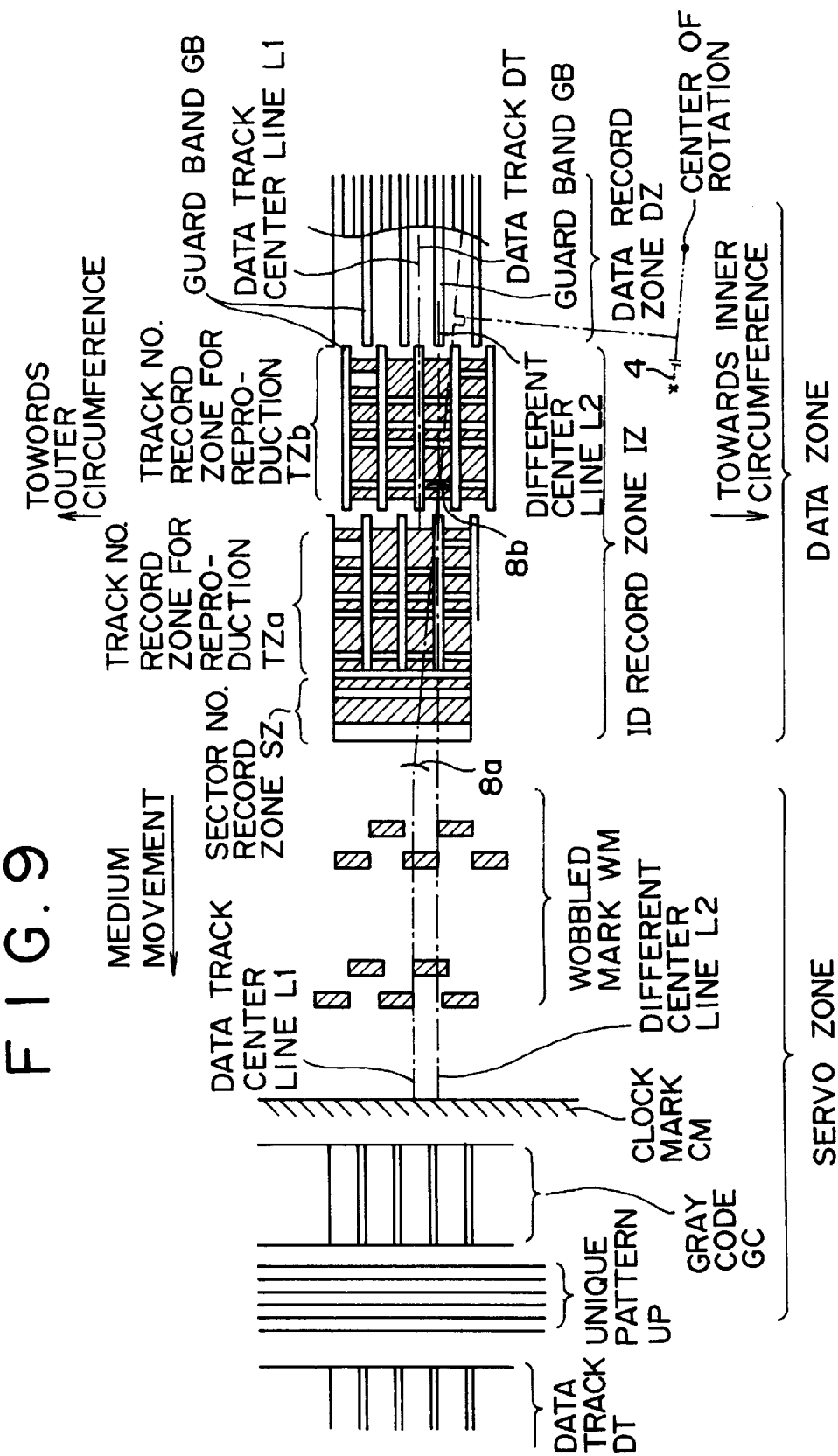

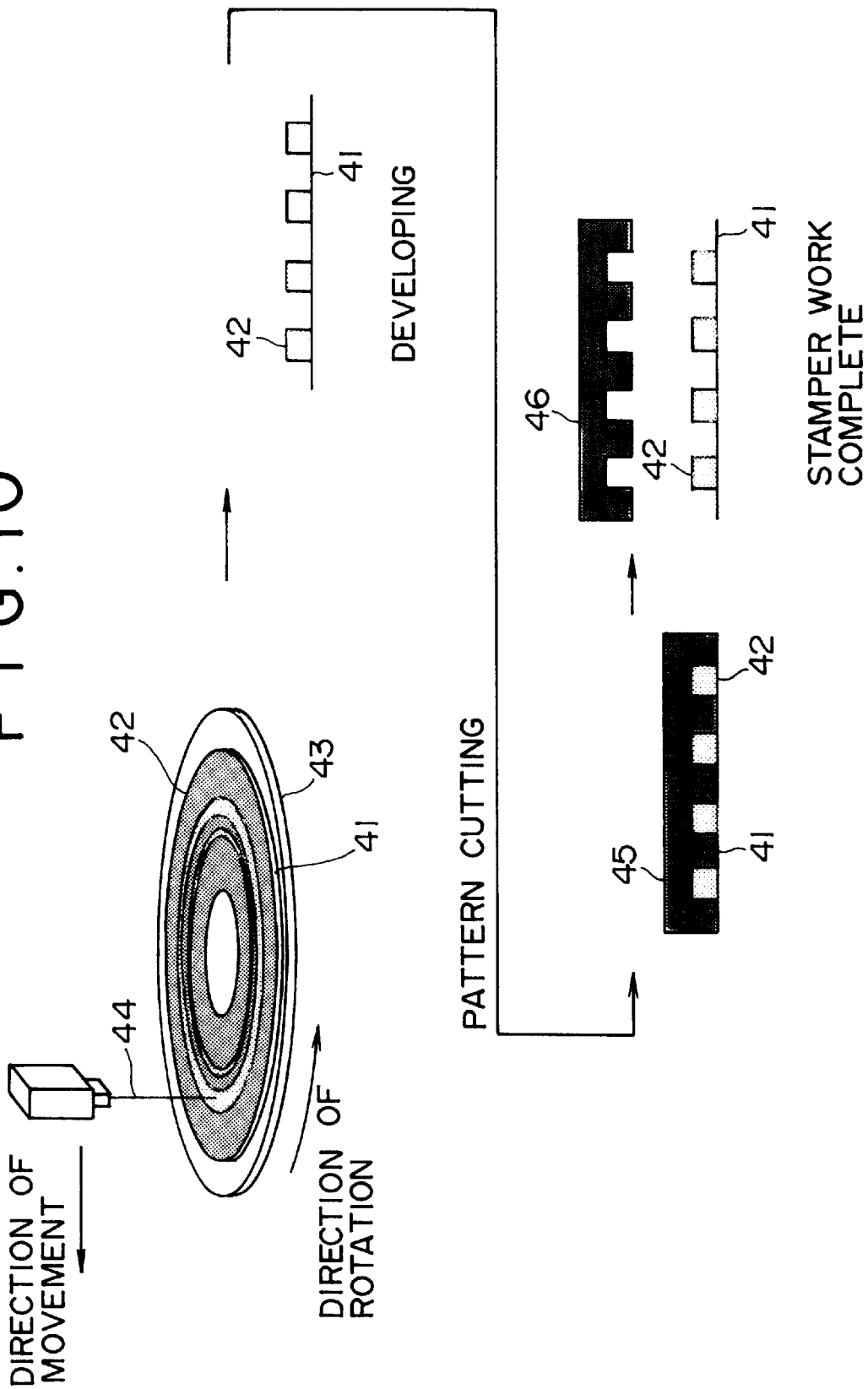

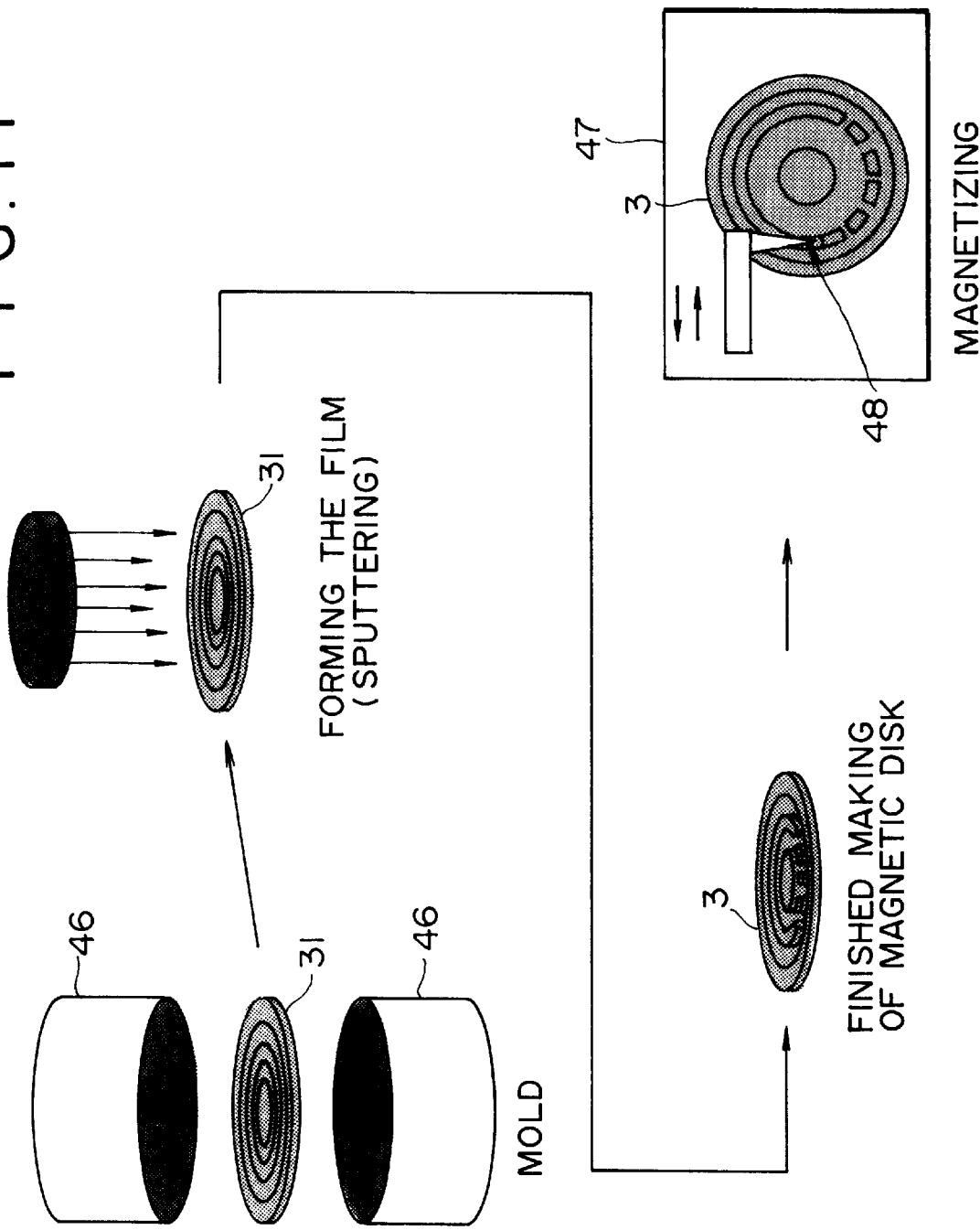

F I G. 15
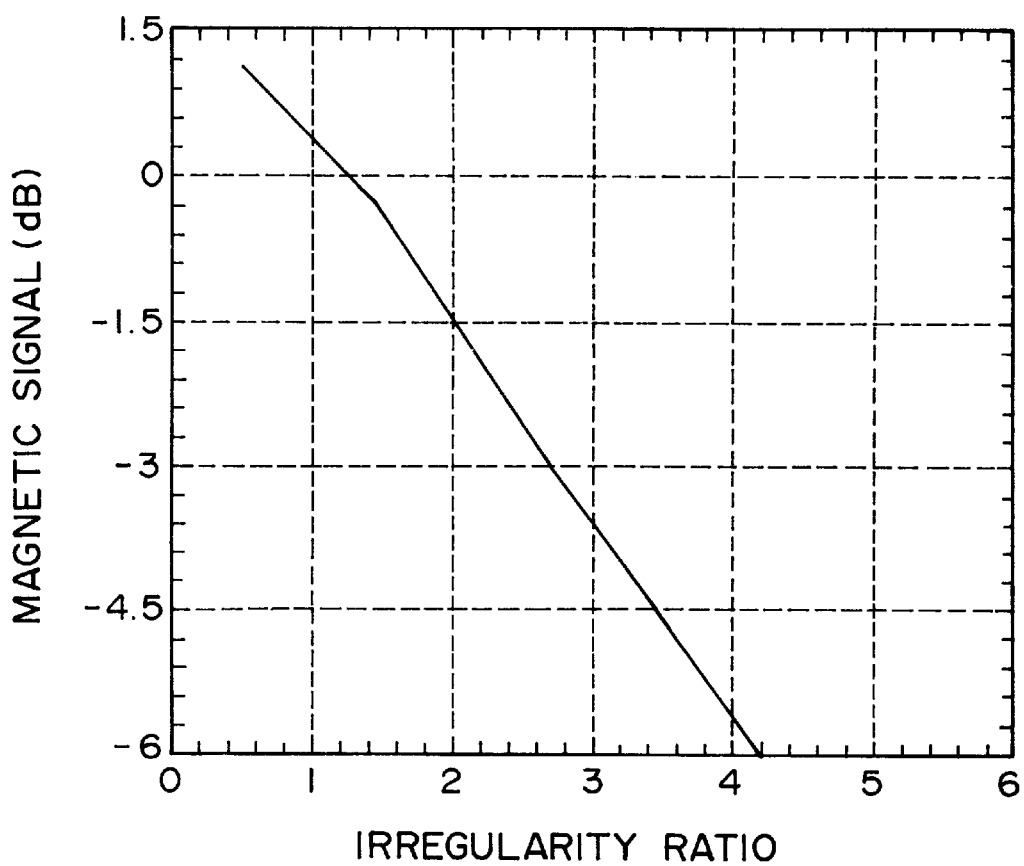

MAGNETIC DISK HEAD HAVING DATA ZONE AND CONTROL SIGNAL ZONES WHICH GENERATE DIFFERENT LIFTS WHEN FLOWN OVER BY A HEAD SLIDER

BACKGROUND OF THE INVENTION

1. Field of the Invention

This invention relates to a magnetic disk and magnetic disk device provided with this disk for recording and reproducing data and programs by means of a magnetic head mounted on a floating head slider.

2. Description of Related Art

Computer systems for instance utilize a hard disk unit as the magnetic disk unit. The magnetic disk housed inside this hard disk unit is covered with a magnetic film on both surfaces and data is recorded or reproduced in a track configuration on this magnetic film by means of a magnetic head mounted on a floating head slider above both sides of the magnetic disk. The mechanism that drives the floating head slider with the magnetic head, and the drive section for the magnetic disk are incorporated beforehand inside the unit panel so that data is recorded at a relatively high density and the recorded data can be accessed at high speed.

The magnetic disk unit described below has been previously proposed as a hard disk unit by this applicant (in Japanese laid-open patent publication No. 6-259709 and U.S. patent application Ser. No. 08/331,588 applied for on Mar. 4, 1994, now abandoned, but continued as file wrapper continuation application Ser. No. 08/704,435). The magnetic disk housed in this hard disk unit has data record zones (hereafter "data zones") and control signal record zones (hereafter "servo zones") each formed in a radial configuration comprised of irregularities and containing data. More specifically, the data zones are concentric and the data tracks are formed of protrusions (projections) to record the data and guard bands to isolate adjacent tracks are formed of concavities (indentations). Further, gray codes to specify a particular data track, clock marks as a reference when generating a servo clock pulse and wobble marks (hereafter "servo patterns) for controlling the tracking of a magnetic head are formed on these servo zones. This servo pattern may be formed of protrusions or concavities.

At least one among these gray codes, clock marks and wobble marks is formed along the movement path (locus) of the magnetic head. The reproducing and recording of data by the magnetic head is controlled by means of the signal obtained from the reproduction of these gray codes, clock marks or wobble marks.

The magnetic head measures the amount of change in eccentricity of the magnetic disk by means of the signal obtained from the reproduction of these gray codes, clock marks or wobble marks and the record and reproduction of data by the magnetic head is controlled by the results of this eccentric deviation measurement.

In a hard disk device housing a built-in magnetic disk of this structure, the guard band for the data tracks is formed as a material concavity so that there is little possibility of reproduction of data from the guard band. Thus there is no longer a need to widen the guard band in order to reduce cross talk so that the track pitch can be narrowed and the recording capacity increased.

Additionally, since the gray codes, clock marks or wobble marks can be formed as protrusions or concavities along the movement path (locus) of the magnetic head, the positions for these codes can be placed with extremely high accuracy for utilization for example by optics technology so that even if the track pitch is narrowed, the data can be recorded accurately.

SUMMARY OF THE INVENTION

In view of the above, it is therefore an object of this invention to provide a magnetic disk which can be accurately scanned along the entire surface and a magnetic disk unit provided with said magnetic disk.

The above object of the invention is achieved by a magnetic disk and magnetic disk device housing that magnetic disk wherein the magnetic disk has data record zones and control signal record zones formed as irregularities across the disk surface and segmented radially in tracks on the disk, and the amount of lift when passing over the control signal record zone of the head slider is less than the amount of lift when passing over the data record zone and yet greater than the glide height the height, i.e., of the head slider just above the surface of the disk.

In the above structure, the amount of lift when the head slider passes over the control signal record zone is made to be smaller than the amount of lift when passing over the data record zone so that even if the amplitude of the magnetic signal obtained from the control signal record zone is smaller than the amplitude of the magnetic signal obtained from the data record zone, accurate scanning of the magnetic signal obtained from the control signal record zone is possible.

BRIEF DESCRIPTION OF THE DRAWINGS

FIGS. 7A and 7B are a cross sectional structural view radially and a cross sectional structural view towards the periphery of the magnetic disk of this invention shown in FIG. 7.

FIG. 8 is a more detailed cross sectional structural view of the magnetic disk shown in FIG. 6.

FIG. 9 is a detailed flat view showing the surface of the magnetic disk shown in FIG. 6.

FIG. 10 is a first view describing the manufacturing method of the magnetic disk shown in FIG. 6.

FIG. 11 is a second view describing the manufacturing method of the magnetic disk shown in FIG. 6.

FIG. 15 is a view showing the relation of magnetic signal obtained from the servo pattern on the magnetic disk, with the irregularity ratio of the data zone divided by the irregularity ratio of the servo zone.

DETAILED DESCRIPTION OF THE PREFERRED EMBODIMENT

A preferred embodiment of this invention is explained next while referring to the accompanying drawings. While the above described embodiment refers to a preferred working example of the invention and has a variety of preferred technical limits it should be understood that this in no way limits the scope of the claims, and the invention is not particularly restricted by these embodiments.

Figure 1:
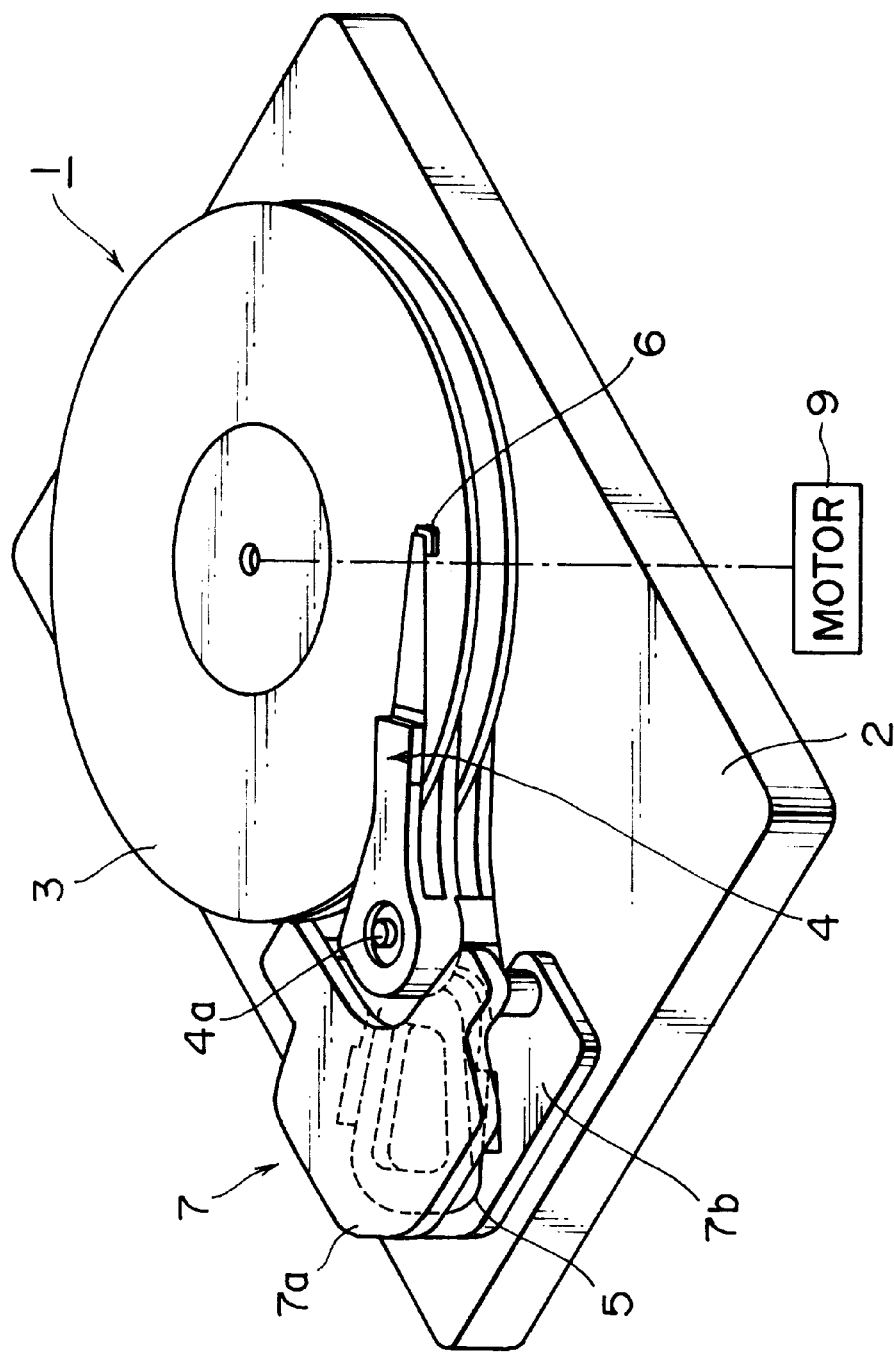
FIG. 1 is a oblique view of the structural layout of the hard disk device of the embodiment of this invention.

FIG. 1 is an oblique view showing the structure of the hard disk unit as an embodiment of the magnetic disk unit of this invention.

This hard disk unit 1 comprises a spindle motor 9 at the rear side of a flat portion of a chassis 2 formed of aluminum alloy and a magnetic disk 3 driven at fixed angular speed by the spindle motor 9. An arm 4 is mounted for revolving around the perpendicular shaft 4a on the chassis 2. A voice coil 5 is mounted at one end of this arm 4. A head slider 6 is mounted at the other end of the arm 4. The voice coil 5 is installed to be interposed between a magnet 7a and a magnet 7b. A voice coil motor 7b is formed by means of the voice coil 5 and the magnets 7a and 7b.

Figure 2:
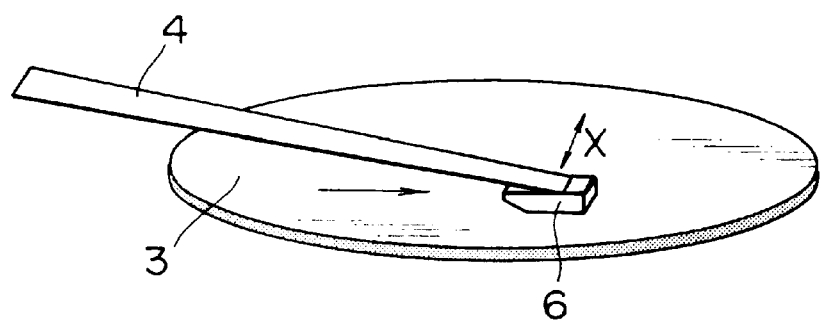
FIG. 2 is an oblique view showing the operation of the head slider of the hard disk device of this invention.

In the above structure, when an external electrical current flows into the voice coil 5, the arm 4 starts to rotate around the perpendicular shaft 4a due to the current flowing in the voice coil 5 and the magnetic field of the magnets 7a and 7b. The head slider 6 attached to the other end of the arm 4 can then move radially along the magnetic disk 3 in the direction of the arrow X shown in FIG. 2. The magnetic head 8 (see FIG. 3) mounted in this head slider 6 can then search (seek operation) the magnetic disk 3 and perform record and reproduction of data on the specified track.

Figure 3:
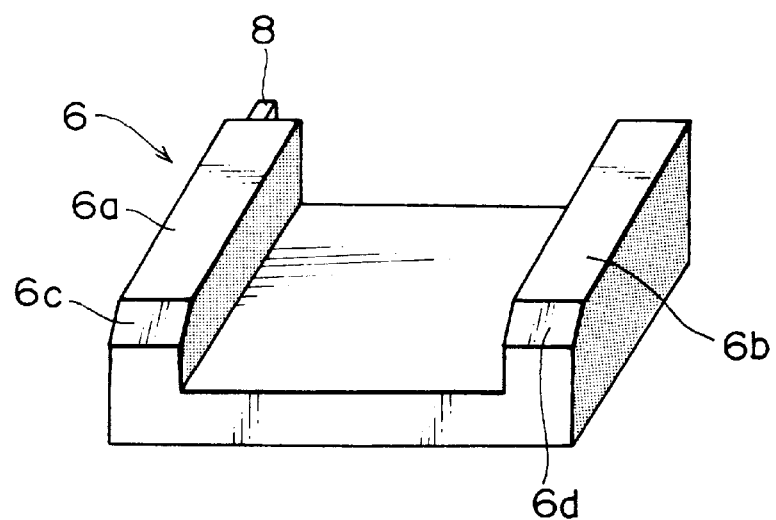
FIG. 3 is an oblique view showing a detailed example of the head slider of the hard disk device of this invention.
Figure 4:
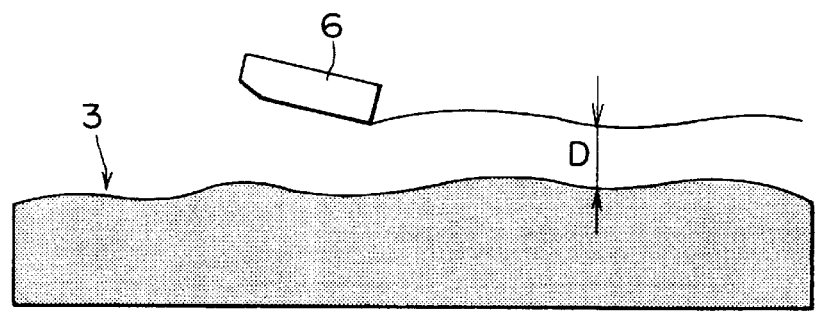
FIG. 4 is a side view showing operation of the head slider of the hard disk device of this invention.

This head slider 6 is formed with rails 6a and 6b as an air bearing surface on both sides of the lower surface as shown in FIG. 3 and with taper sections 6c and 6d on the air in-flow end of these rails 6a and 6b. This arrangement permits an air flow to provide lift between the surfaces of the magnetic disk 3 and the rails 6a and 6b accompanying the rotation of the magnetic disk 3 when the head slider 6 has approached the surface of the rotating magnetic disk 3. This lift force permits a minute gap (lift amount) D to be maintained by the head slider 6 and the magnetic head 8 from the surface of the magnetic disk 3 as shown in FIG. 4.

Figure 5:
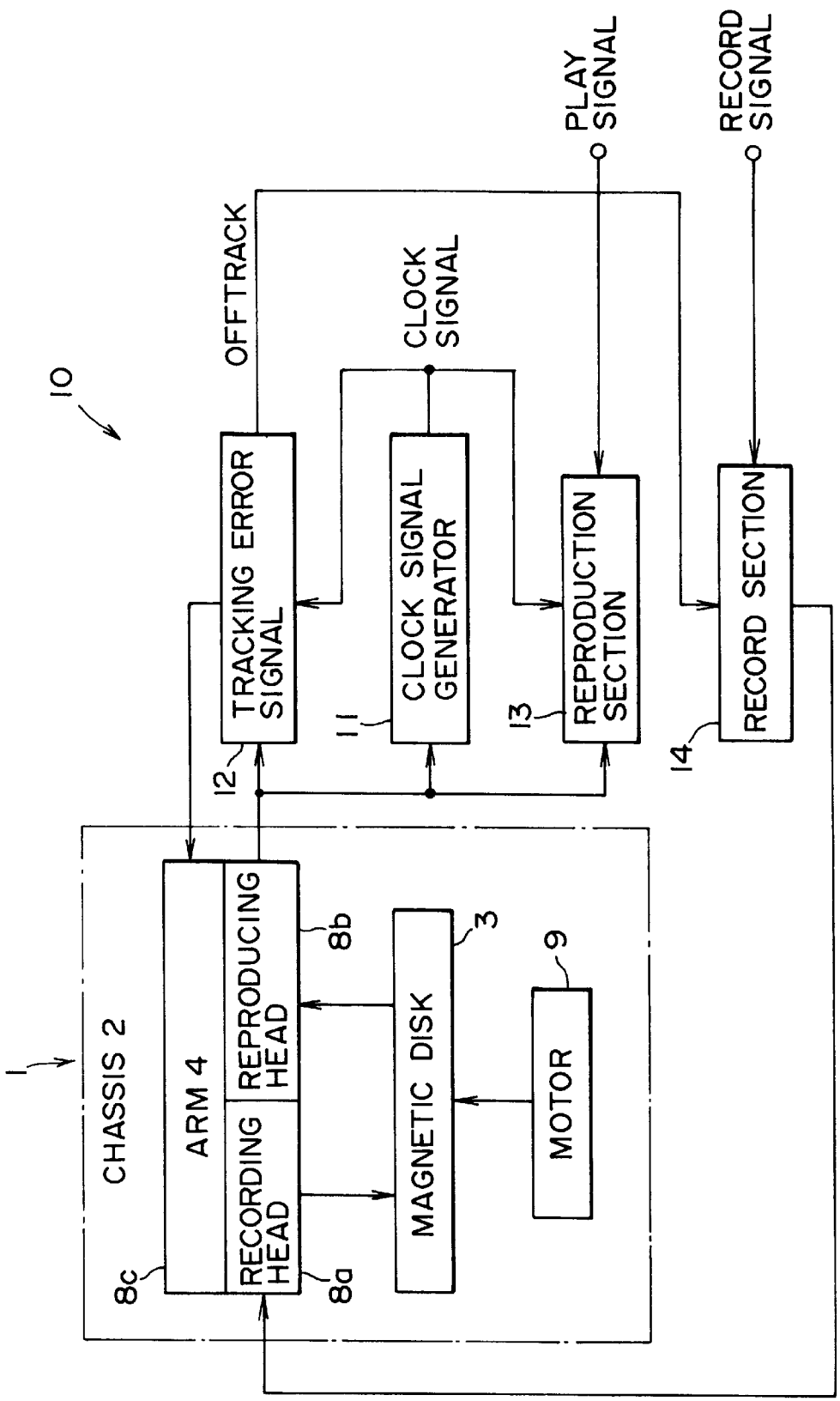
FIG. 5 is a block diagram showing the structure of the control section of the hard disk device of this invention shown in FIG. 1.

FIG. 5 is a block diagram showing a typical structure of the control section for the hard disk unit of FIG. 1. The clock signal generator 11 of the controller 10 generates a clock signal from the signal reproduced by the reproduce head 8b of the magnetic head 8 and this clock signal is sent to the tracking servo 12 and the reproduction section 13. The tracking servo 12 refers to the clock signal from the clock signal generator 11, generates a tracking error signal by means of the signal from the reproduction head 8, and drives the arm 4 versus these signals. This arrangement allows tracking control the record head 8a and the reproduction head 8b for a designated position on the magnetic disk 3. The record section 14 modulates a record signal supplied from a circuit not shown on the drawing and records on the magnetic disk 3 by means of the record head 8a. The reproduction section 13 demodulates the record signal from the reproduction head 8b and send it to the circuit mentioned above. The tracking servo section 12 monitors the tracking error signal and regulates the record section 14 and stops record operation if a large shock is applied to the magnetic disk device or if the magnetic head 8a deviates from the data track.

Figure 6:
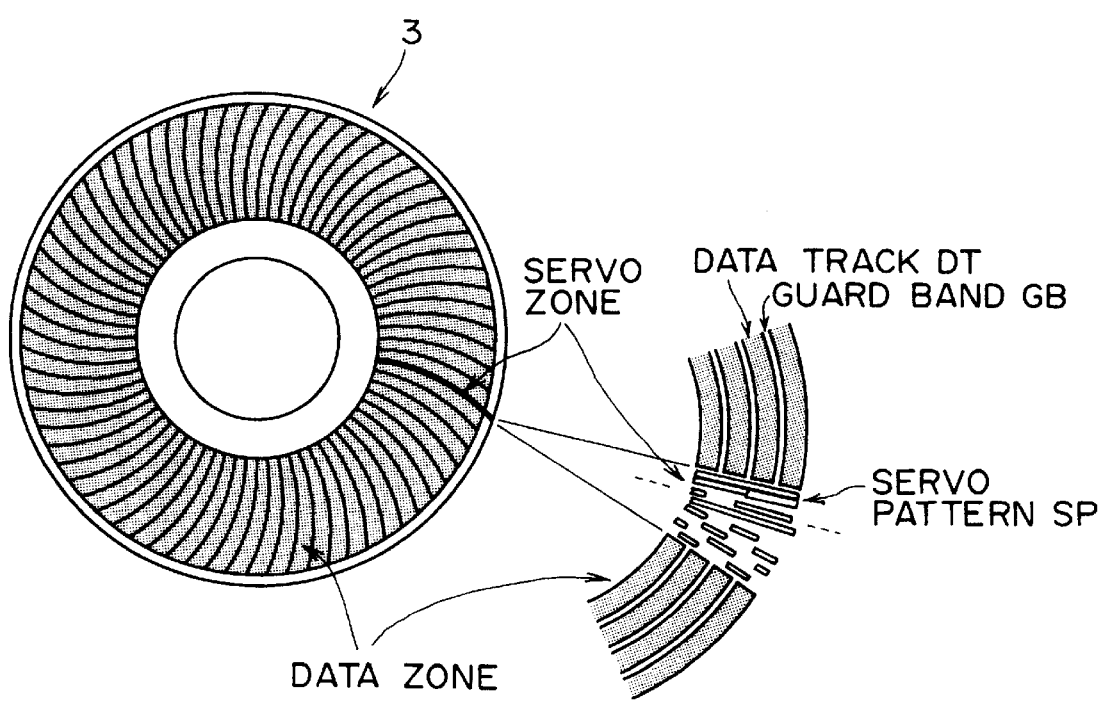
FIG. 6 is a flat view showing an embodiment of the magnetic disk of this invention.

FIG. 6 is a flat view of an embodiment of the magnetic device of this invention. FIG. 7A is a structural view of a radial cross section and FIG. 7B is a structural view of a cross section of the periphery.

The base 31 made from such materials as plastic, glass or aluminum has data record zones (data zones) and control signal record zones (servo zones) respectively formed radially and a magnetic film 32 is formed on the surface. More specifically, a data track for recording data in concentric data zones is formed to have protrusions and the guard band GB for separating the adjacent data zones is formed with concavities. The gray code for specifying a particular data track DT, the clock mark for use as a reference for generating the servo clock, and servo patterns such as the wobble mark for controlling the tracking of the magnetic head 8 are also formed on the servo zone. This servo pattern SP can be formed as a protrusion or may be formed as a concavity.

The magnetic disk 3 described above has servo zones and data zones formed to match the track of the magnetic head 8 when moving towards the inner or outer circumference of the disk so that a period of time can be maintained for the seek operation and deviations in PLL circuit operation occurring due to clock pulse generation can be limited. Azimuth loss is also restricted.

FIG. 8 is a more detailed cross section structural view of the magnetic disk shown in FIG. 6. Both surfaces of the base 31 are formed in steps of for instance 200 nm. This base 31 can be composed of glass and has a thickness of 0.65 mm. When formed of plastic the thickness is 1.2 mm. Both surfaces of the base 31 are further formed with a magnetic film 32. When the base 31 is formed of plastic, a particle coating 321 for instance is formed for instance of $SiO_2$ (spherical silica) particles from 0.5 to a maximum of 100 particles per 1 micrometer or preferably at a particle density of 10 particles per 1 micrometer. This is preferable because rigidity and durability can be maintained when the base 31 is made of glass or aluminum but adequate rigidity and durability will not necessarily always be obtained when using a base 31 made of plastic. Further, the irregularities on the surface of will be rough when the base 31 is made of plastic so bringing the magnetic head 8 into close proximity with the magnetic film 32 without making contact will prove difficult.

The dipping method is utilized for forming the particle coating 321 of spherical silica. The average size of the particles at this time is within 50 nm or preferably 8 nm to 10 nm. Setting an average particle size of 8 nm will provide a particle distribution standard deviation of 4.3 nm. Particle density is determined by the concentration and finish speed so monitoring these factors will allow regulation of the irregularities (protrusions/concavities). For instance, the spherical silica can be diluted with isopropyl alcohol to obtain a concentration of 0.01 percent by weight, and this mixture then applied to the base at a finish speed of 125 mm per minute.

A chromium film 322 approximately 80 nm thick is applied above this particle layer 321. This chromium layer 322 functions as an exchange link film and is effective in improving magnetic properties in particular the permanent magnetism. Also, a cobalt-chrome platinum layer 323 approximately 40 nm thick is applied above the chrome layer 322. A protective layer 324 approximately 10 nm comprised of a layer of carbon or $SiO_2$ is formed by an application or by spin coating above the cobalt-chrome platinum layer 323. A lubricant 325 is applied on this protective layer 324.

On the magnetic disk 3 configured as above, a concentric portion of the disk circumference is segmented into 60 sectors and each of these sectors is comprised of 14 segments. Therefore this portion of the disk circumference forms 840 segments. Each of these segments is divided into servo zones and data zones. As shown in FIG. 9, the servo zones are formed into gray codes GC, clock marks CM, and wobbled marks WM. Further, a unique pattern UP is added to the head sector of each segment. However, one sector out of these 60 sectors is recorded with a home index as a PG function instead of the unique pattern UP.

Setting the width of the clock mark CM track as 1, the width of the gray code GC is 20 and the width of the unique pattern UP is 16.

The gray code GC is a code indicating the absolute address (data track number) to specify a particular data track.

The clock mark CM is a mark for the clock pulse forming the reference for record/reproduction. When the reproduction head 8b or reproduces this clock mark CM, a timing signal corresponding to the edge of the clock pulse is issued. These clock marks are formed consecutively in the radially on the magnetic disk 3 as shown in FIG. 9.

The wobbled mark WM is positioned to enclose the center line L1 of the data track mark on the inner side and the outer side and to also maintain a specific distance in the direction of the track. The reproduction head 8b issues a position pulse corresponding to the edge of the pulse emitted when the wobbled mark WM is reproduced. A tracking servo is applied to make sure the level of this positioning pulse is equivalent so that the reproduction head 8b can be placed over the center line L1 of the data track 8b.

An ID record zone IZ is formed at the beginning of the data zone. The record/reproduction data is essentially recorded in the data record zone DZ following this ID record zone IZ. This ID record zone IZ is divided into a sector number record zone SZ and a track number record zone TZ. Of these two zones, at least the sector number record zone SZ is formed consecutively in the radial direction on the magnetic disk 3 just as was the clock mark CM. An 8 bit sector number for specifying a particular sector is recorded on the sector number record zone SZ and two 16 bit numbers for specifying the data track DT are recorded on the data track zone DT. This 40 bit ID data is modulated by PR (partial response) (−1, 0, 1) and recorded on the ID record zone IZ. The reproduction head 8b reproduces the ID data recorded on the ID record zone IZ to emit a pulse train.

The track number record zone TZ is divided up into the reproduce track number TZa and the record track number zone TZb. The reproduce track number TZa is formed at a position along the center line L1 of the data track, however the record track number zone TZb is formed in a position separated in a direction perpendicular (radial direction of magnetic disk 3) to the data track DT by a distance d equal to the center line L1 of data track DT from that center line L2. The value of the distance d decreases the more the inner circumference is approached and increases the more the outer circumference is approached. The same track number is recorded on the reproduce track number TZa and the record track number zone TZb.

The wobbled mark WM for positioning the reproduce head 8b versus the center line L1 of the data track DT, and wobbled mark WM for tracing the center line L2 of the record track number zone TZb with the reproduce head 8b, are formed in the servo zone.

Consequently, in reproduce mode, tracking control of the reproduce head 8b with the wobbled mark WM as a reference, allows scanning with the reproduce head 8b along center line L1 of the data track DT. In contrast, in record mode, tracking control performed by means of tracking error signals obtained by reproduction of the wobbled marks WM by the reproduce head 8b allows scanning by reproduce head 8b of the center line L2 of the record track number zone TZb. The record head 8a is running along the center line L1 of the data track DT at this time.

The zone for recording the sector number or the track number is formed beforehand in this way. These sector numbers and track numbers recorded in this manner can therefore be reliably reproduced regardless of the position status of the reproduce head 8b.

The above described magnetic disk 3 can be manufactured by utilizing optical technology. That manufacturing method is described in FIGS. 10 and 11.

First, the surface of a glass plate 41 is coated for instance with a photoresist 42. This glass plate 41 coated with the photoresist 42 is placed on a turntable 43 and rotated and for instance a laser beam 44 beamed upon only the portions with the photoresist 42 for forming of the irregularities by laser beam pattern cutting. After cutting with the laser beam 44, the photoresist 42 is developed portions of the photoresist 42 through which light is leaking are eliminated. A nickel plating 45 is formed on the glass plate 41 whose surface light leaks have been removed. Then, this nickel plating 45 is stripped from the glass plate 41 and the stamper 46 then set.

The base 31 is then formed by using the stamper 46. A magnetic film 32 is formed on the surface of the base 31 by a method such as sputtering to form the magnetic disk 3.

Figure 12A:
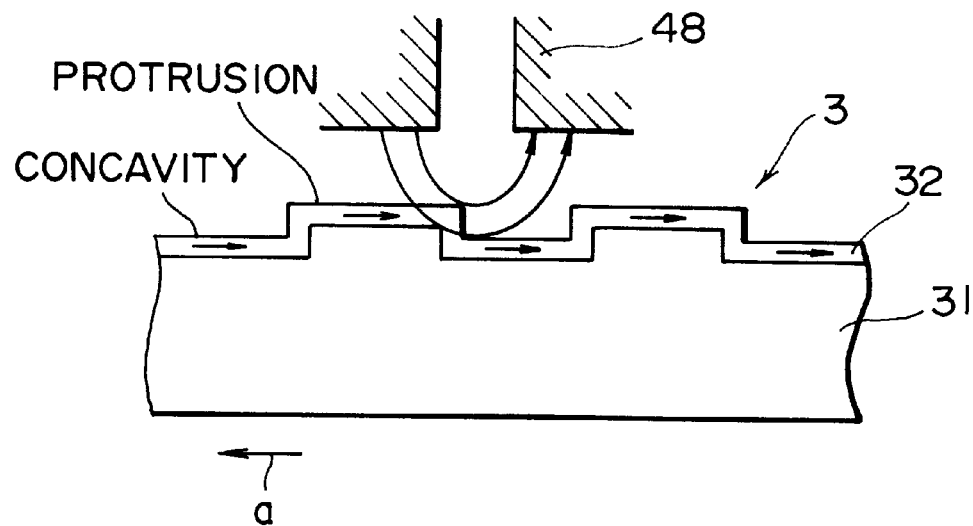
FIG. 12 is a third view describing the manufacturing method of the magnetic disk shown in FIG. 6.
Figure 12B:
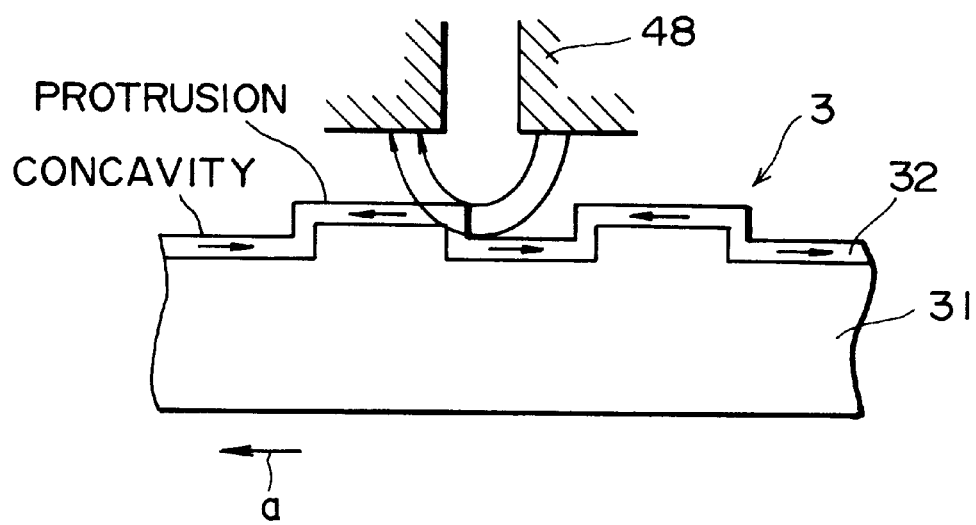
Figure 13A:
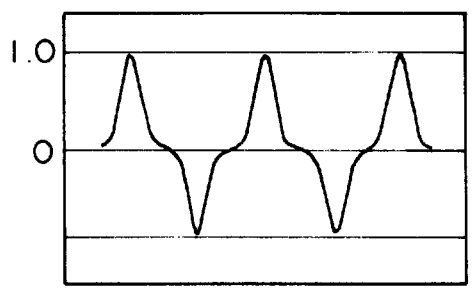
FIGS. 13A and 13B are views showing the magnetic signal amplitude obtained from the servo pattern of the servo zone and the magnetic signal amplitude obtained from the data track of the data zone.
Figure 13B:
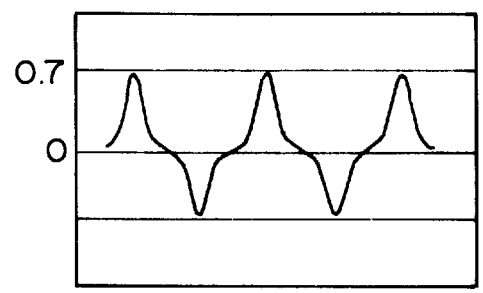

This magnetic disk 3 is then magnetized by the following method. The magnetic disk 3 is placed inside the magnetizer unit 47 and rotated in the direction of the arrow a in FIG. 12. The first direct current is next applied to the magnetizing head 48 as shown in FIG. 12A while the magnetizing head 48 is moved at the track pitch radially above the magnetic disk 3 to temporarily magnetize all the protrusions and concavities of the magnetic disk 3 in the same direction. Afterwards, as shown in FIG. 12B a second magnetizing direct current small when compared with the first direct current, is applied to the magnetizing head 48 at an opposite polarity to the first direct current, while the magnetizing head 48 is moved at the track pitch radially above the magnetic disk 3 to magnetize only the protrusions of the magnetic film 32 on the magnetic disk 3 in an opposite direction and the writing of the positioning signals (wobbled mark, clock mark etc.) is performed.

Thus, since the positioning signals can be written by one magnetizing head 48, replacement of the magnetizing head 48 is not required and production of the magnetic disk 3 is improved.

However, the magnetic reversal zone between the protrusion magnetized with a polarity opposite that of the concavities; or in other words the magnetic signal amplitude obtained from the servo pattern of the servo zone (in FIG. 12B) is approximately 70 percent of that of the normal magnetized protrusion zone, in other words the magnetic signal amplitude obtained from the data track of the data zone (in FIG. 12A). This is due to difference occurring in the magnetic interaction of the identical poles on the servo pattern with the result that the flux density leaking from the servo pattern is less than the flux density leaking from the data track. Therefore, the magnetic signal amplitude on this magnetic disk will essentially tend to fluctuate. The flux density leaking from the servo pattern will be equivalent to the flux density leaking from the data track thus making it difficult to control variations in the amplitude of the magnetic signal.

However, since the magnetic signal obtained from the above mentioned servo pattern is utilized as the servo signal for positioning the magnetic head on the data track, the magnetic signal from the servo pattern may be mistaken for the data track signal when the amplitude is approximately 70 percent of the data track signal amplitude. The track address signal from the gray code in particular, is identified at the magnetic reversal zone position according to the servo clock by means of the clock mark. This magnetic reversal zone position is set at a position where the magnetic signal amplitude will be greater than a predetermined value. Therefore when the magnetic signal amplitude is smaller than a predetermined value, the magnetic head cannot be positioned accurately because it is mistakenly determined that no magnetic signal is present.

A magnetic disk device 1 containing the magnetic disk 3 configured as described above, may be formed with a magnetic signal amplitude obtained from the servo pattern SP that is equivalent to the magnetic signal amplitude obtained from the data track DT for the purpose of avoiding reading errors in the magnetic signal obtained from the servo pattern which occurred in the prior art. To achieve equivalent amplitudes, the lift amount DS of the head slider 6 above the servo pattern SP may be set smaller than the lift amount DD for the head slider 6 above the data track DT.

The extent of spacing loss can be changed by varying the lift amount D of the head slider 6. More specifically the extent of spacing loss can be lessened by reducing the lift amount D of the head slider 6. The relation between extent of spacing loss SL and drop in lift 7D from lift amount DD to lift amount DS' of the head slider 6 is shown in formula 1.

Formula 1

$$SL = 54.6 \cdot \Delta d / \lambda \min$$

Here,

SL is the spacing loss $\Delta d$ is the drop in lift amount of head slider 6

$\lambda \min$ is the record wavelength of the maximum inner circumference of the servo clock of magnetic disk 3

Here, the record wavelength $\lambda \min$ is related to the clock frequency of the servo signal. The rotating speed of the magnetic disk 3 is usually a fixed speed and the clock frequency of the servo signal is also fixed so that the record wavelength of the servo clock varies according to the radius of the magnetic disk 3. In this embodiment, the record wavelength $\lambda \min$ of the servo clock at the maximum inner circumference is utilized as the record wavelength $\lambda \min$ in formula 1. The approximately 70 percent ratio of the magnetic signal amplitude from the servo pattern SP and the magnetic signal amplitude obtained from the data track DT is equivalent to −3 dB so that in order to make both of these signals equal, this −3 dB must be utilized for the extent of spacing loss SL. Rewriting of formula 1 to show the difference in lift d, between the lift amount DD of head slider 6 above the data track DT and the lift amount DS of head slider 6 above the servo pattern is shown in formula 2.

Formula 2

$$d = (-3/54.6) \cdot \lambda \min$$

Here, d is the difference in lift of head slider 6

$\lambda \min$ is the record wavelength of the maximum inner circumference of the servo clock of magnetic disk 3

The ratio of the reproduction magnetic signal amplitude from the servo pattern SP and the magnetic signal obtained from the data track DT are made equivalent by means of formula 2 so that when the drop in lift amount $\Delta d$ increases, the amplitude of the magnetic signal from the servo pattern SP becomes larger thus allowing precise control of the magnetic head position.

The maximum value for the drop in lift amount $\Delta d$ when passing the servo pattern SP versus when passing the data track DT becomes the lift amount DD minus the glide height GH (in other words the value from lift amount DD of magnetic head 8 over data track DT, to the lift amount DD just prior to the magnetic head 8 contacting the surface {tip of protrusions occurring on surface} of the magnetic disk 3. The range of the drop in lift amount $\Delta d$ should therefore be set to satisfy the conditions in the following formula 3.

Formula 3

$$d \leq \Delta d \leq DD - GH$$

Here, d is the difference in lift of head slider 6.

$\Delta d$ is the drop in lift amount of head slider 6

DD is the lift amount for head slider 6 over data track DT

GH is the glide height

First the relation between fluctuations in lift of the head slider 6, rate of concavities and protrusions in the data zone and rate of concavities and protrusions in the data zone was investigated.

The disk for measurement was glass and formed with data zones and servo zones just as with the actual magnetic disk 3. These data zones and servo zone patterns were formed between a radius from 15.5 mm to 35.0 mm on the glass disk in the same way as the actual magnetic disk 3. A coating of resist was first applied to the glass disk surface and the data zone and servo zone patterns exposed to light based on the cutting data on the resist. After exposure, developing was performed for instance by RIE (reaction ion etching) to form the data zone and servo zone patterns.

The data zones separate the servo zones into seven zones in the circumferential direction of the glass disk. The ratio of data track DT and guard bands GB, in other words the ratio of protrusions to concavities varies as shown below. The guard band depth of the data zone which is the depth of the concavities is 200 nm.

| Zone No. | Protrusion and concavity ratio |
| --- | --- |
| 1 | 0.5 |
| 2 | 2.0 |
| 3 | 3.0 |
| 4 | 4.0 |
| 5 | 5.0 |
| 6 | 8.0 |
| 7 | 10.0 |

The servo zones were formed in a curve along the seek path of the head slider 6 and not in a direct line from the inner to the outer circumference as was the actual servo zone. The servo pattern depth in the servo zone or in other words, the concavity depth was 200 nm. The ratio of protrusions to concavities was 2.0.

The head slider 6 is typically comprised of two nanosliders rails of a 50 percent flat taper. The slider length is 2.0 mm, slider width is 1.6 mm, the rail width is 200 um, the load is 3.5 gf. When a head slider 6 as described above is positioned on a glass disk with a radius of 30.2 mm, the head slider 6 and the glass disk will have a relative speed of 7 m per second when the glass disk is rotated at 4,000 rpm, and the lift amount of the head slider 6 will be approximately 50 nm.

Figure 14:
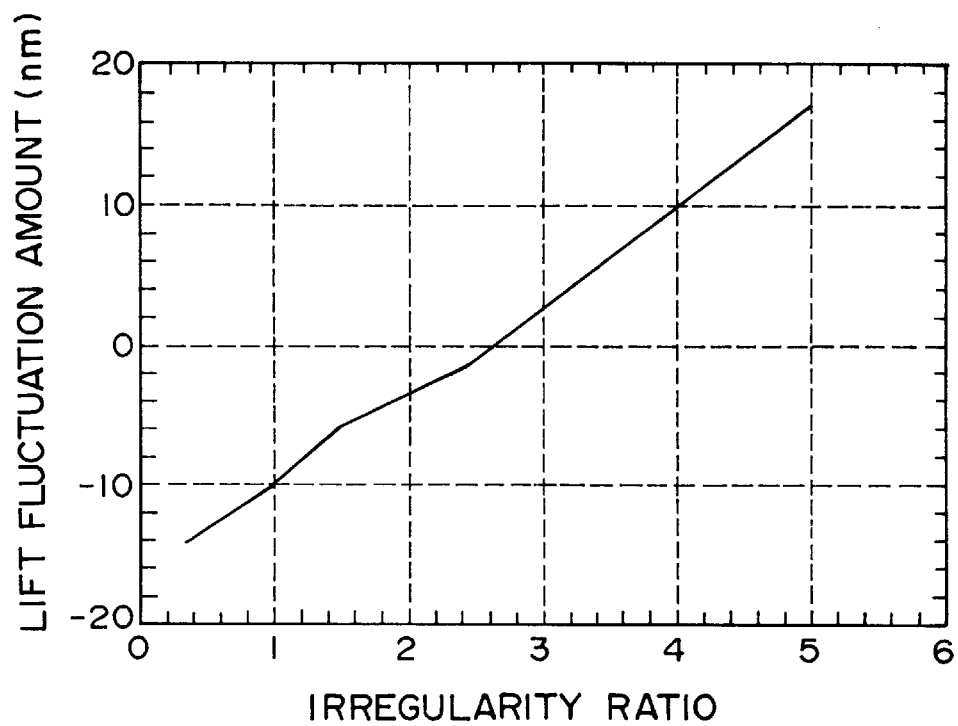
FIG. 14 is a view showing the relation of lift amount of the head slider of the hard disk device, with the irregularity ratio of the data zone on the magnetic disk shown in FIG. 6 divided by the irregularity ratio of the servo zone.

FIG. 14 shows the lift fluctuation amount of the head glider 6, and ratio of guard band GB to data track DT in the data zone (in other words the ratio of protrusion area per rail width versus concavity area per rail width in the head slider 6) and relation with the ratio of the servo zone SP pattern (in other words, ratio of protrusion area per rail width versus concavity area per rail width on the head slider 6). Measurements were made with a laser vibrometer and as FIG. 14 clearly shows, the value after division between 0 to 2.6 reveals that the lift amount DS of the head slider 6 on the servo pattern SP is smaller than the lift amount DD above the data track DT. When the value obtained after division is greater than 2.6 the lift amount DS of the head slider 6 on the servo pattern SP is greater than the lift amount DD of the head slider 6 above the data track DT.

As can be seen when considering the lift amount D in design of the head slider 6, variations in the lift amount D of the head slider 6 must be taken into account due to differences in the mechanical precision of the various parts incorporated into the magnetic disk device. For instance if the head slider 6 was designed for a lift amount D of 50 nm, the tolerance for various items is generally specified versus the fluctuation amount for the head slider 6. In other words the tolerance would be ±10 percent for variations in machining precision of the head slider 6, and ±20 percent for variations in the head slider 6 load, ±10 percent for variations in the Z height, ±10 percent for irregularities in the base 31, ±10 percent for curvature of the base 31, ±10 percent for fluctuations during seek, ±10 percent for variations in atmospheric pressure, ±10 percent for the servo zone, −5 percent for a margin, providing a glide height GH of 35 nm.

The glide height lift amount D will therefore be approximately 70 percent due to the above factors. The lift amount D for the head slider 6 is 50 nm in this embodiment so 70 percent of 50 nm yields a figure of 35 nm. The minimum wavelength for a typical servo signal is 1.6 um. In consideration of these conditions, providing a figure within 1.2 for the above described division will allow setting a magnetic signal amplitude obtained from the servo pattern SP that is equivalent to the magnetic signal amplitude obtained from the data track DT. These equal magnetic amplitudes will eliminate mistaken readings of the magnetic signal obtained from the servo pattern SP that occurred in the prior art.

Next a magnetic layer was formed on the glass disk by the sputtering method and the magnetic signal amplitude obtained from the servo pattern SP compared with the magnetic signal amplitude obtained from the data track DT. Sputtering was performed to form in sequence, a chromium layer of 100 nm, a cobalt-chrome platinum layer of 20 nm, and a carbon layer of 10 nm. A composite head consisting of a reproduce MR head and a record inductive head mounted in a nanoslider.

FIG. 15 shows the magnetic signal obtained from the servo pattern SP and the ratio of data track DT of the data zone and guard band GB (in other words the ratio of protrusion area per rail width versus concavity area per rail width in the head slider 6) and the relation of the servo zone SP pattern ratio (in other words, ratio of protrusion area per rail width versus concavity area per rail width on the head slider 6). As a comparison with FIG. 14 clearly shows, when the lift variation amount of the head lifter 6 is small, the magnetic signal obtained from the servo pattern SP becomes small. Also since the minimum signal wavelength of the servo signal is 1.6 um when the lift fluctuation amount of the head slider 6 when passing the servo zone is approximately 10 nm, the magnetic signal amplitude obtained from the servo pattern SP will be roughly equivalent to the 1.6 um magnetic signal amplitude obtained from the data track DT.

By setting the difference d in lift amount as shown in formula 2 for lift amount DS of head slider 6 above the servo pattern SP, and the lift amount DD of head slider 6 above the data track TT, the magnetic signal amplitudes obtained from the signal pattern SP and from the data track DT can be made equal to each other thus preventing mistakes in reading the magnetic signal from the SP pattern which occurred in the prior art.

As described above, this invention allows accurate reading of the magnetic symbols obtained from the control signal record zone so that stable tracking control of the magnetic head is performed and the record and reproduction of data is performed with good precision.

What is claimed is:

1. A magnetic disk for recording and reproducing data in conjunction with a magnetic head mounted in a floating head slider, said disk having at least one data record zone and at least one control signal zone formed radially thereon in the form of irregularities across the disk surface, wherein, said irregularities are configured to have an irregularity ratio such that said head slider flies at a first height DD-Δd above said disk surface when passing over the control signal record zone and at a second height DD above said disk surface when flying over said disk record zone and said first height is less than said second height but greater then a glide height GH, a ratio of the ratio of irregularities on said data record zone to the ratio of irregularities on said control signal record zone is 1.2 or less, Δd is the difference between DD and the flying height of the slider above the data record zone when flying over the control signal zone;

GH is the height of the slider over the data record zone just prior to contact of the magnetic head with the disk surface; and spacing loss over said control signal zone is minimized such that effective amplitudes of magnetic signals read out from said control signal zone are equal to or greater than said effective amplitudes of magnetic signals read out from said data record zone.

2. A magnetic disk as claimed in claim 1, wherein an extent of spacing loss SL is expressed as SL=54.6Δd/λmin, where Δd is assumed as a decrease in flying height when the head slider passes over the control signal record zone as compared with that over the data record zone, and λmin is assumed as a clock record wavelength on the innermost circumference of the disk.

3. A magnetic disk as claimed in claim 2, wherein when said spacing loss is −3 dB, a difference d between the lift when passing the data record zone and the lift when passing the control signal record zone is expressed as d=(−3/54.6)·λmin; and the range of the drop in lift amount Δd is specified as d<Δd<DD−GH.

4. A magnetic disk device comprising:

a magnetic disk formed with at least one data record zone and at least one control signal record zone formed radially by irregularities across the disk surface, a head slider for moving radially across and floating above said magnetic disk surface and, a recording/reproducing head mounted in said head slider for recording and reproducing data on said magnetic disk wherein, the head slider flying height when passing over the control signal record zone is less than the flying height when passing over the data record zone and yet greater than the glide height, wherein
said irregularities are configured to have an irregularity ratio such that said head slider flies at a first height DD-Δd above said disk surface when passing over the control signal record zone and at a second height DD above said disk surface when flying over said disk record zone and said first height is less than said second height but greater then a glide height GH, a ratio of the ratio of irregularities on said data record zone to the ratio of irregularities on said control signal record zone is 1.2 or less, Δd is the difference between DD and the flying height of the slider above the data record zone when flying over the control signal zone;

GH is the height of the slider over the data record zone just prior to contact of the magnetic head with the disk surface, and spacing loss over said control signal zone is minimized such that effective amplitudes of magnetic signals read out from said control signal zone are equal to or greater than said effective amplitudes of magnetic signals read out from said data record zone.

5. A magnetic disk device as claimed in claim 4 wherein an extent of spacing loss SL is expressed as SL=54.6·Δd/λmin, where Δd is assumed as a decrease in flying height when the head slider passes over the control signal record zone as compared with that over the data record zone, and λmin is assumed as a clock record wavelength on the innermost circumference of the disk.

6. A magnetic disk device as claimed in claim 5, wherein when said spacing loss if −3 dB, a difference d between the flying height of said head slider when passing the data record zone and the flying height of said head slider when passing the control signal record zone is expressed as d=(−3/54.6)·λmin; and the range of the drop in flying height Δd is specified as d<Δd<DD−GH, wherein, magnetic signal amplitudes of signals read out from said control signal and data record zones are substantially equal or equal.

7. A magnetic disk device for recording and reproducing data by means of a magnetic head mounted in a floating head slider, in which at least one data record zone and at least one control signal record zone are formed radially by irregularities across the disk surface wherein, a ratio of the ratio of irregularities on said data record zone to the ratio of irregularities on said control signal record zone is 1.2 or less, wherein
said irregularities are configured to have an irregularity ratio such that said head slider flies at a first height DD-Δd above said disk surface when passing over the control signal record zone and at a second height DD above said disk surface when flying over said disk record zone and said first height is less than said second height but greater then a glide height GH, Δd is the difference between DD and the flying height of the slider above the data record zone when flying over the control signal zone;

GH is the height of the slider over the data record zone just prior to contact of the magnetic head with the disk surface; and spacing loss over said control signal zone is minimized such that effective amplitudes of magnetic signals read out from said control signal zone are equal to or greater than said effective amplitudes of magnetic signals read out from said data record zone.

8. A magnetic disk comprising:

a magnetic disk formed with at least one data record zone and at least one control signal record zone formed radially by irregularities across the disk surface, a head slider for moving radially across and floating above said magnetic disk surface and, a recording/reproducing head mounted in said head slider for recording and reproducing data on said magnetic disk wherein, a ratio of the ratio of irregularities on said data record zone to the ratio of irregularities on said control signal record zone is 1.2 or less, wherein
said irregularities are configured to have an irregularity ratio such that said head slider flies at a first height DD-Δd above said disk surface when passing over the control signal record zone and at a second height DD above said disk surface when flying over said disk record zone and said first height is less than said second height but greater then a glide height GH, Δd is the difference between DD and the flying height of the slider above the data record zone when flying over the control signal zone;

GH is the height of the slider over the data record zone just prior to contact of the magnetic head with the disk surface, spacing loss is −3 dB, a difference d between the lift when passing the data record zone and the lift when passing the control signal record zone is expressed as d=(−3/54.6)·λmin, with λmin being a record wavelength of a servo clock at a minimum inner circumference of said magnetic disk surface; and the range of the drop in lift amount Δd is specified as d<Δd<DD−GH; and spacing loss over said control signal zone is minimized such that effective amplitudes of magnetic signals read out from said control signal zone are equal to or greater than said effective amplitudes of magnetic signals read out from said data record zone.

* * * * *